April 9, 1935. F. ROTTMANN 1,997,121
CONTROL APPARATUS FOR USE WITH LIQUID RECEIVERS AND THE LIKE
Filed Dec. 11, 1931
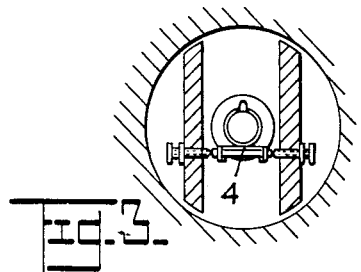
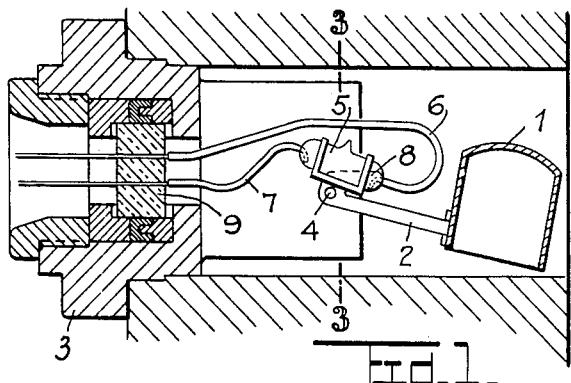
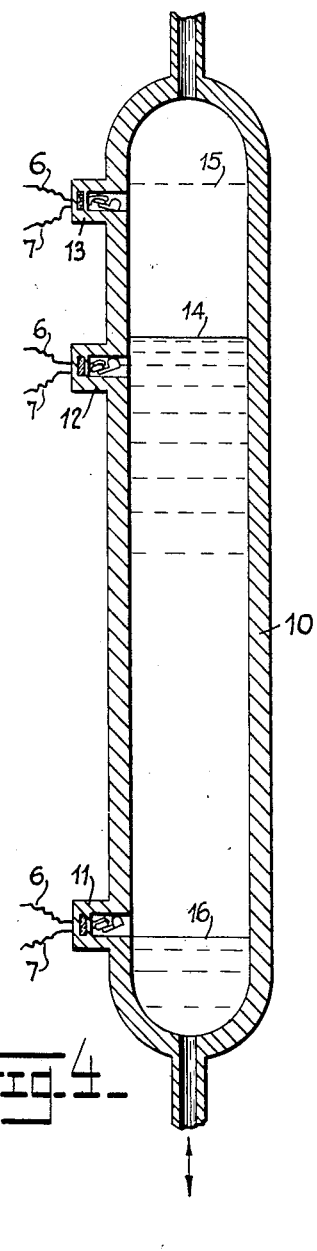
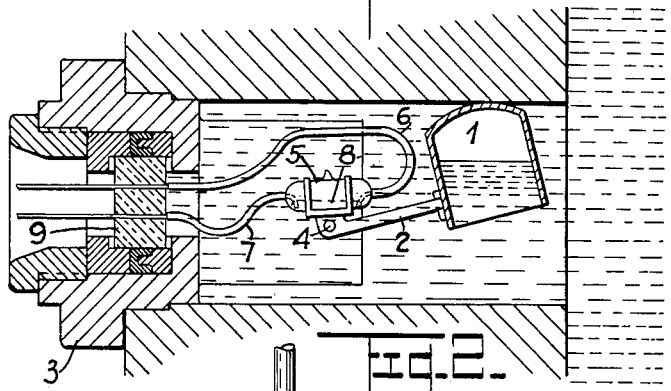
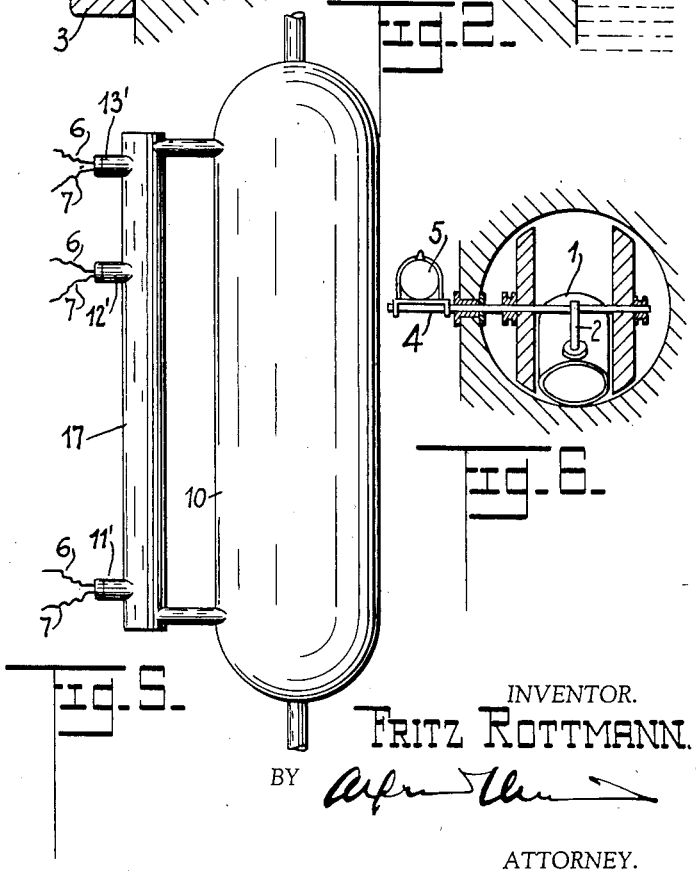
INVENTOR.
FRITZ ROTTMANN.
BY
ATTORNEY.

Patented Apr. 9, 1935

1,997,121

UNITED STATES PATENT OFFICE 1,997,121

CONTROL APPARATUS FOR USE WITH LIQUID RECEIVERS AND THE LIKE

Fritz Rottmann, Dusseldorf, Germany, assignor to Schloemann Aktiengesellschaft, Dusseldorf, Germany, a corporation of Germany Application December 11, 1931, Serial No. 580,236
In Germany January 10, 1931

4 Claims. (Cl. 200—84)

My invention relates to liquid receivers and more particularly to receivers under the load of compressed air, and the object of my invention is to provide in connection with such receivers improved electrically controlled means for automatically connecting and disconnecting the water pressure pumps, closing the shut-off valve upon the dropping of the lowest water level, opening the shut-off valve upon the rising of the lowest water level and visibly indicating the water level in the liquid receiver.

In devices of this kind heretofore used, the electric current is set to work either in accordance with the varying air pressure controlled by the variations in the height of the water level by pressure gages, the pointers of which close electric contacts, or by a column of mercury rising and descending in proportion to the water level, the surface of said mercury column at definite points opening or closing the electric circuit. In case of high water- and air-pressures, the pressure gages are not quite accurate and after a certain time fail to function properly, while, after long use, the surface of the column of mercury becomes affected by dirt and mercury oxide. In both cases, therefore, disturbing errors will occur after some length of operation.

To avoid this drawback, there is provided, in accordance with the present invention, either within the liquid receiver, or in a conduit laterally disposed outside of the receiver and connected therewith both at the top and bottom a mercury reversing switch, and cooperating therewith a diving bell adapted to rise and descend with the rising or descending water level in the receiver. With such an arrangement, the switch always acts accurately and surely, never failing because neither dirt nor mercury oxide can foul the contacts. The reversing switch, the diving bell and the connecting wires are contained in a small casing so that the entire assembled device can be mounted either in the liquid receiver or in a laterally disposed outside conduit. The two electric wires are melted into an insulating glass plug. However, if desired, the thin spindle of the diving bell can be outwardly extended laterally through the wall of the casing, and the reversing switch can be visibly mounted on said spindle, in which case the glass plug can be dispensed with while the casing will become a little shorter. In place of the diving bell, also a float of any well-known type can be used.

On the annexed drawing, Fig. 1 shows the diving bell and mercury reversing switch, the former being lowered in the air space and the reversing switch in an inclined position so that the mercury touches one terminal only;

Fig. 2 is a similar view as Fig. 1, showing the diving bell raised and the reversing switch in an approximately horizontal position, in which the mercury touches both terminals;

Fig. 3 is a transverse section along 3—3 in Fig. 1;

Fig. 4 is a longitudinal section through the liquid receiver equipped with three reversing switches as shown in Figs. 1 and 2 at different points.

Fig. 5 is a similar view as Fig. 4 showing the reversing switches disposed in an outside separate conduit.

Fig. 6 is a detail view showing a modified arrangement of the reversing switch.

In the drawing, 1 is the diving bell provided with a projecting arm 2, whereby it is pivotally mounted on a thin spindle 4 secured in the walls of the casing 3. To the arm 2 is secured the evacuated hollow tube 5, in the walls of which are melted two electrically conducting wires 6 and 7 leading from the tube outwardly. The tube contains a small quantity of mercury shown at 8, which depending on the position of the switch either electrically connects the two wires 6 and 7, or leaves them electrically disconnected. The two wires 6 and 7 are melted in a glass plug 9 which is held tight by a packing against the receiver pressure in the casing 3; the wires 6 and 7 being passed outside lead to the various electrical apparatus (not shown) which effect the above mentioned controlling operations and the indications of the water-levels.

At 10 in Fig. 4 is shown a liquid receiver adapted to contain water under pressure.

In this receiver are provided at three different places 11, 12 and 13 switches equipped with diving bells, as above described and as shown in Figs. 1 and 2. Each switch is disposed within a related pocket in a side wall of the receiver 10 and the top and bottom walls of each pocket constitute stops engageable by the related diving bell 1 to predetermine the two operative tilted positions of the related switch. Moreover, the diving bell and the tube of each switch preferably are disposed, each at least in part, in balanced or substantially balanced relationship to opposite sides of the pivot 4. Assuming that the installation is in regular operation and the water level has reached the place indicated in Fig. 4 at 14, the diving bells will then be in a raised position, at the places 11 and 12. Therefore, the wires 6 and 7 will be electrically connected by the mercury and the corresponding lamps (not shown) provided for visibly indicating the water level will be lighted. At the place indicated in Fig. 4 at 13, the diving bell 1 occupies the position shown in Fig. 1, and consequently the wires 6 and 7 are disconnected and the electric circuit is open. But in case the water level in 10 rises to the place indicated at 15 in Fig. 4, then also the diving bell at the place 13 will rise and by the upward rocking of the reversing switch 5 the mercury therein will electrically connect the wires 6 and 7, a lamp (not shown) will light up and the pumps (not shown) for forcing water into the liquid receiver 10 will be stopped. If the water level gradually drops to the place indicated at 16, then successively at first the lamp connected with the reversing switch at the place 13 will be extinguished, while at the same time the pumps are started again, then the lamp controlled by the switch at 12 will be extinguished, and finally the lamp controlled by the switch at the place 12, while at the same time the shut-off valve (not shown) is closed so that no compressed air can pass to the operating machines. If the water level again rises above the place indicated at 11, the diving bell of the switch at that place will again be raised and the corresponding lamp will be lighted, whereas the shut-off valve will again be opened.

In the modification shown in Fig. 5, the reversing switches are arranged in a separate outside conduit 17, which is connected to the liquid receiver 10 both at the top and bottom, the positions of the switches being indicated at 11', 12' and 13' corresponding to those shown in Fig. 4. The switches will therefore function in the same manner as above described.

While in Figs. 1 and 2 the switch is shown as being disposed together with the diving bell in the same casing, Fig. 6 shows a different arrangement in that the spindle 4 is rotatably journalled and is extended laterally outside of the casing, the mercury reversing switch being in this case mounted on the spindle so as to rock therewith and being visible. With this modified construction, the wires 6 and 7 need not be passed through a special glass plug.

While I have described and shown only one embodiment of the new device, it is understood, of course, that modifications in the details and their arrangement may be made without a departure from the principal inventive idea involved herein.

I claim:

1. In combination, a liquid container having a side opening, a removable closure for said opening, said closure having an opening, a conductor sealed within said closure opening and extending therethrough from the interior to the exterior of the container, a tiltable circuit controlling switch pivotally mounted on said closure at the inner side thereof and having its contact elements completely isolated from the contents of the container, a float operatively connected to said switch for tilting the same in response to rise and fall of the liquid contents of the container, and a flexible connection between a contact of said switch and said conductor, the float, switch and closure constituting a unitary structure in which the float and switch are disposed entirely within the area defined by a prolongation of the peripheral surface of the closure, and the container opening being of a size to permit insertion of the switch and float therethrough to their operative positions upon positioning of the closure to close said side opening, and to permit removal of said switch and float therethrough with the closure when the latter is removed.

2. In combination, a liquid container having a side opening, a removable closure for said opening, said closure having an opening, a conductor sealed within said closure opening and extending therethrough from the interior to the exterior of the container, a tiltable circuit controlling switch disposed inwardly of the closure and having its contact elements completely isolated from the contents of the container, the closure having switch supporting means permanently rigid therewith extending inwardly therefrom and on which the switch is pivotally mounted, a float operatively connected to said switch for tilting the same in response to rise and fall of the liquid contents of the container, and a flexible connection between a contact of said switch and said conductor, the float, switch and closure constituting a unitary structure, and the container side opening being of a size to permit insertion of the switch and float therethrough to their operative positions upon positioning of the closure to close said side opening, and to permit removal of said switch and float therethrough with the closure when the latter is removed.

3. In combination, a liquid container having a side wall opening in the form of an elongated pocket, a closure for said opening, said closure having an opening, a conductor sealed within said closure opening and extending therethrough from the interior of the container to the exterior thereof, a tiltable circuit controlling switch pivotally mounted on said closure at the inner side thereof and having its contact elements completely isolated from the contents of the container, a float operatively connected to said switch for tilting the same in response to rise and fall of the liquid contents of the container, said float being disposed within said pocket for cooperation with the top and the bottom walls thereof to predetermine the two operative tilted positions of the switch, and a flexible connection between a contact of said switch and said conductor.

4. In combination, a liquid container having a side opening, a removable closure for said opening, said closure having an opening, a conductor sealed within said closure and extending therethrough from the interior to the exterior of the container, a horizontally disposed switch supporting pin carried by said closure at the inner side thereof, said pin having a permanently fixed relationship to said closure, a switch mounted on said pin for tilting movement to open and closed positions, said switch including contact elements completely isolated from the contents of the container, a flexible connection between a contact of said switch and said conductor, and a float connected to said switch for tilting the same in response to rise and fall of the liquid contents of the container, said switch and said float being disposed each at least in part in substantially balanced relationship to opposite sides of said pivot pin, the float, switch and closure constituting a unitary structure in which the float and switch are disposed entirely within the area defined by a prolongation of the peripheral surface of the closure, and the container opening being of a size to permit insertion of the switch and float therethrough to their operative positions upon positioning of the closure to close said side opening, and to permit removal of said switch and float therethrough with the closure when the latter is removed.

FRITZ ROTTMANN.